United States Patent
Leroux

(10) Patent No.: US 9,366,599 B2
(45) Date of Patent: Jun. 14, 2016

(54) METHOD FOR MEASURING THE DEFORMATION OF A TURBO-MACHINE BLADE DURING OPERATION OF THE TURBO-MACHINE

(71) Applicant: SNECMA, Paris (FR)

(72) Inventor: Andre Leroux, Moissy-Cramayel (FR)

(73) Assignee: SNECMA, Paris (FR)

( * ) Notice: Subject to any disclaimer, the term of this patent is extended or adjusted under 35 U.S.C. 154(b) by 643 days.

(21) Appl. No.: 13/767,056

(22) Filed: Feb. 14, 2013

(65) Prior Publication Data
US 2013/0211743 A1 Aug. 15, 2013

(30) Foreign Application Priority Data

Feb. 14, 2012 (FR) ..................... 12 51354

(51) Int. Cl.
| | |
|---|---|
| G01L 1/00 | (2006.01) |
| G01L 3/00 | (2006.01) |
| G01L 5/00 | (2006.01) |
| G01M 15/14 | (2006.01) |
| G01B 21/32 | (2006.01) |
| F01D 17/06 | (2006.01) |

(Continued)

(52) U.S. Cl.
CPC ............... *G01M 15/14* (2013.01); *F01D 17/06* (2013.01); *F01D 21/003* (2013.01); *G01B 21/32* (2013.01); *G01H 1/006* (2013.01); *G01M 5/0016* (2013.01); *G01M 5/0041* (2013.01); *G01M 99/004* (2013.01); *Y02T 50/672* (2013.01)

(58) Field of Classification Search
CPC ........... G01L 3/00; G01L 3/10–3/1457; G01L 5/0047; G01N 2203/0075

USPC ...................................................... 702/41–43
See application file for complete search history.

(56) References Cited

U.S. PATENT DOCUMENTS

| 4,080,823 A | 3/1978 | Stargardter |
| 7,822,560 B2 * | 10/2010 | LeMieux ............... F03D 7/042 290/44 |

(Continued)

FOREIGN PATENT DOCUMENTS

| DE | 10 2010 019 014 A1 | 11/2011 | |
| DK | WO 9957435 A1 * | 11/1999 | ............ F03D 1/065 |

(Continued)

OTHER PUBLICATIONS

French Preliminary Search Report and Written Opinion issued Oct. 10, 2012, in Patent Application No. FR 1251354, filed Feb. 14, 2012 (with English Translation of Category of Cited Documents).

*Primary Examiner* — John Breene
*Assistant Examiner* — Jeremy Bishop
(74) *Attorney, Agent, or Firm* — Oblon, McClelland, Maier & Neustadt, L.L.P.

(57) ABSTRACT

A method for measuring the deformation of a turbo-machine blade including:
- a step of positioning at least one accelerometer onto a local point of the turbo-machine blade;
- a first step of measuring the centrifugal force, by the accelerometer, at the local point of the turbo-machine blade along the given measurement direction at a first predetermined speed;
- a second step of measuring the centrifugal, at a second predetermined speed;
- a step of determining the angular displacement of the measurement direction of the accelerometer relative to the centrifugal direction as a function of the first acceleration measurement and the second acceleration measurement, said angular displacement corresponding to an angular deformation of the local point of the turbo-machine blade.

10 Claims, 2 Drawing Sheets

(51) Int. Cl.
  *F01D 21/00* (2006.01)
  *G01M 5/00* (2006.01)
  *G01M 99/00* (2011.01)
  *G01H 1/00* (2006.01)

(56) References Cited

U.S. PATENT DOCUMENTS

| | | | | |
|---|---|---|---|---|
| 8,039,981 | B2* | 10/2011 | Egedal | G01H 1/006 290/43 |
| 8,092,080 | B2* | 1/2012 | Mitchell | G01K 1/024 374/100 |
| 8,092,174 | B2* | 1/2012 | Egedal | F03D 11/0091 416/18 |
| 2009/0290982 | A1* | 11/2009 | Madsen | F03D 1/0633 416/61 |
| 2009/0301055 | A1* | 12/2009 | Kallappa | F01D 21/003 60/39.091 |

FOREIGN PATENT DOCUMENTS

| | | |
|---|---|---|
| FR | 2 646 468 A1 | 11/1990 |
| FR | 2 714 171 A1 | 6/1995 |

\* cited by examiner

METHOD FOR MEASURING THE DEFORMATION OF A TURBO-MACHINE BLADE DURING OPERATION OF THE TURBO-MACHINE

BACKGROUND OF THE INVENTION

1. Field of the Invention

The present invention relates to the field of aeronautics, and more particularly, a process for measuring the deformation of an aircraft blade during its operation.

2. Description of the Related Art

Conventionally, an aircraft turbo-machine includes rotors comprising a plurality of radial blades to accelerate an air flow from upstream to downstream in the body of the turbo-machine. Performances of a blade mainly depend on the blade shape when the same is rotationally driven with the rotor it is mounted to. In reference to FIG. 1A, a blade 1 is mounted on a turbo-machine shaft 2 extending along an axis U. The blade 1 has traditionally a tridimensional shape which is changed as a function of the rotation speed of the turbo-machine shaft 2. By way of example, in reference to FIG. 1B, the blade 1 can elongate radially and/or twist when the rotation speed of the turbo-machine shaft 2 increases.

To determine an optimum shape for the turbo-machine blade, a theoretical model of the blade is conventionally used, which mathematically defines the blade shape, for example, by means of a meshing. In a known manner, such a mathematical model further enables stresses globally applied to the blade to be defined when the same is locally deformed. In other words, if the blade head elongates by 3 mm, the theoretical model allows to predict what the blade global deflected curve is, from its head up to its shank, as well as stresses applied to the blade.

A theoretical model of a blade is, by nature, defined from mathematical hypotheses that need to be practically validated to certify the conformity of the theoretical model. To do this, the blade deformation is measured during the operation of the turbo-machine and the measurement of the deformation is compared to a theoretical measurement provided by the theoretical model. In case of a deviation, the mathematical parameters of the theoretical model are modified for the theoretical deformation measurement to correspond to the "actual" deformation measurement measured during tests. This step is conventionally designated by those skilled in the art as a step of "resetting the theoretical model".

Thus, the conformity of a theoretical model directly depends on the measurement accuracy of the blade actual deformation during operation of the turbo-machine.

In reference to FIG. 2, for a turbo-machine including an axial turbo-machine shaft 2, to which radial blades 1 are mounted, and a fan case 21 wrapping the blades 1, position sensors C are conventionally placed onto the inner surface of the case 21 so as to detect the passage of the heads 10 of the blades 1 on the same level as the sensors C. By way of example, the position sensors C are in the form of optical sensors which enable the shutting time of the optical beam to be measured during the passage of a blade head. This shutting time directly depends on the blade head shape during its rotation which enables the fundamental deformation mode of the blade, for example a blade twisting, to be conventionally inferred. This deformation measurement method is known to those skilled in the art as "tip timing".

When the turbo-machine does not include an outer case, which is for example the case of so-called "open rotor" contra-rotating propeller turbo-machines, it is not possible to implement the "tip timing" method since the turbo-machine does not include a support for position sensors. A solution to suppress this drawback would be to provide a support strut for the position sensors so as to position said sensors external to said propellers in order to simulate a deformation measurement by "tip timing". In practice, this solution is to be avoided because the support strut induces a change in the aerodynamic behaviour of the turbo-machine propellers and thus a worsened accuracy in the deformation measurement.

A deformation measurement by "tip timing" also has this drawback that it only enables a local deformation at the end of the blade to be detected. It is then difficult to infer the global deformation of the blade therefrom, in particular, when the blade has preferential stiffness directions which is the case, for example, for a blade of composite material.

BRIEF SUMMARY OF THE INVENTION

This invention aims at achieving a measurement of the deformation of a turbo-machine blade which is simple, accurate and implementable for any turbo-machine, regardless of whether it has a turbo-machine case.

In order to eliminate at least some of these drawbacks, the invention relates to a method for measuring the deformation of a turbo-machine blade including:
- a step of positioning at least one accelerometer onto a local point of the turbo-machine blade, the accelerometer being capable of measuring an acceleration at the local point of the turbo-machine blade along at least one given measurement direction;
- a step of rotating the turbo-machine blade at a first predetermined speed, the accelerometer being subjected to a centrifugal force having a determined direction;
- a first step of measuring the centrifugal force, by the accelerometer, at the local point of the turbo-machine blade along the given measurement direction;
- a step of rotating the turbo-machine blade at a second predetermined speed, different from the first predetermined speed, so as to cause an angular displacement of the measurement direction of the accelerometer relative to the centrifugal direction;
- a second step of measuring the centrifugal force, by the accelerometer, at the local point of the turbo-machine blade along the given measurement direction; and
- a step of determining the angular displacement as a function of the first acceleration measurement and the second acceleration measurement, said angular displacement corresponding to an angular deformation of the local point of the turbo-machine blade.

By virtue of the invention, a local deformation of the blade can be measured at a position of one's choice. Thus, an accurate deformation measurement is obtained for any type of turbo-machine, with or without a case, and for any type of blade, whether metallic or composite. Indeed, the accelerometer for measuring a local deformation can be positioned by taking preferential stiffness directions of a blade of composite material into consideration.

Further, the determination of the blade deformation by measuring a local angular deformation is simple to be implemented, given that the centrifugal direction is a perfectly defined direction when the blade is deformed upon rotating. This results in an increased accuracy in the deformation measurement which is beneficial to correct the theoretical blade model. With a theoretical model compliant with reality, a blade profile can then be satisfactorily tested without resorting to actual tests of the turbo-machine blade.

Preferably, the method comprises a step of obtaining the value of the centrifugal force at the first predetermined rotation speed and a step of obtaining the value of the centrifugal force at the second predetermined rotation speed (V'), the angular displacement being determined by the following formula:

$$\alpha_x = \arccos\left(\frac{Gx}{G}\right) - \arccos\left(\frac{Gx'}{G'}\right).$$

Obtaining the value—that is the norm—of the centrifugal force (by measurement, calculation or assessment) enables the angular displacement characteristics of the deformation to be directly obtained. This is particularly advantageous because the blade deformation can be measured at several local points by means of a calculator connected to one or more accelerometers.

According to one aspect of the invention, the accelerometer being capable of measuring an acceleration at the local point of the turbo-machine blade along at least two different given measurement directions, the method comprises:

a first step of measuring the centrifugal force, by the accelerometer, at the local point of the turbo-machine blade along the given measurement directions;

a step of rotating the turbo-machine blade at a second predetermined speed different from the first predetermined speed, so as to cause an angular displacement of the measurement directions relative to the centrifugal direction;

a second step of measuring the centrifugal force, by the accelerometer, at the local point of the turbo-machine blade along the given measurement directions;

a step of determining the angular displacement as a function of the first acceleration measurement and the second acceleration measurement, said angular displacement corresponding to an angular deformation of the local point of the turbo-machine blade.

By virtue of two measurement directions, it is not necessary to obtain the value of the centrifugal force—that is its norm—which speeds up the deformation measurement and increases the reliability of the deformation measurement. Furthermore, because of the presence of two measurement directions, any kind of blade deformation can be advantageously measured, in particular an elongation of the blade in the radial direction under the effect of centrifugal forces.

Preferably, the at least two measurement directions are orthogonal, the angular displacement being determined by the following formula:

$$\alpha_x = \arctan\left(\frac{Gy}{Gx}\right) - \arctan\left(\frac{Gy'}{Gx'}\right).$$

The measurement of the centrifugal force along two measurement directions enables the angular displacement characteristic of the deformation to be directly obtained without need for obtaining the norm of this force. This is particularly advantageous because the deformation can be directly and accurately measured by means of a calculator connected to one or more accelerometers locally placed on the blade.

Preferably, the accelerometer is capable of measuring an acceleration at the local point of the turbo-machine blade along at least three different given measurement directions forming an orthogonal trihedron.

By virtue of the three measurement directions, the measurement sensitivity can be advantageously increased when the accelerometer extends in a plane tangent to the blade curvature. In other words, flexion and torsion type deformations of the blade are measured with a better accuracy.

Preferably, the accelerometer is a microelectromechanical system, preferably piezoresistive sensor. Thus, any deformation is converted as an electric current directly interpretable with a calculator. Further, a microelectromechanical system (MEMS) sensor has low dimensions and mass which do not disturb the aerodynamic behaviour of the blades and thus deformation thereof.

Yet preferably, the accelerometer has a mass in the order of 0.1 g in order not to influence the deformation measurement of the blade.

According to an aspect of the invention, at least one accelerometer is positioned at the surface of the turbo-machine blade. Thus, the accelerometer can then be simply attached by bonding to measure the deformation of the turbo-machine blade shrouding.

Preferably, at least one accelerometer is positioned in the thickness of the turbo-machine blade. The deformation of inner areas of the blade can thus be measured which improves the measurement of the blade deformation. This is particularly advantageous to measure the deformation of a composite blade.

According to a preferred aspect of the invention, the accelerometer is positioned on a turbo-machine blade of composite material.

BRIEF DESCRIPTION OF THE SEVERAL VIEWS OF THE DRAWINGS

The invention will be better understood upon reading the following description, given only by way of example, and referring to the appended drawings wherein.

DETAILED DESCRIPTION OF THE INVENTION

It is worthy of note that the figures set out the invention in a detailed manner to implement the invention, wherein said figures can of course be used to better define the invention as required.

The invention will now be presented for an open-rotor type contra-rotating propeller turbo-machine, but it goes without saying that the invention is applicable to any turbo-machine for propelling an aircraft, in particular a turbojet.

Positioning at Least One Accelerometer

Figure 1A:
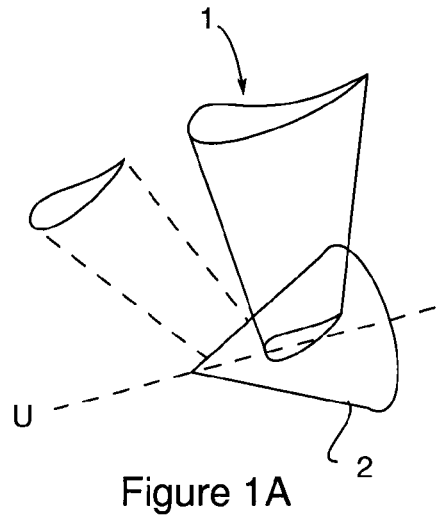
FIG. 1A is a perspective view of a turbo-machine blade when the turbo-machine is off (already described)
Figure 1B:
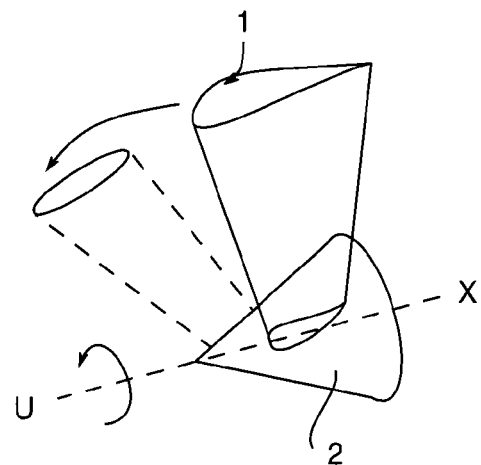
FIG. 1B is a perspective view of a turbo-machine blade when the turbo-machine is operating (already described)
Figure 2:
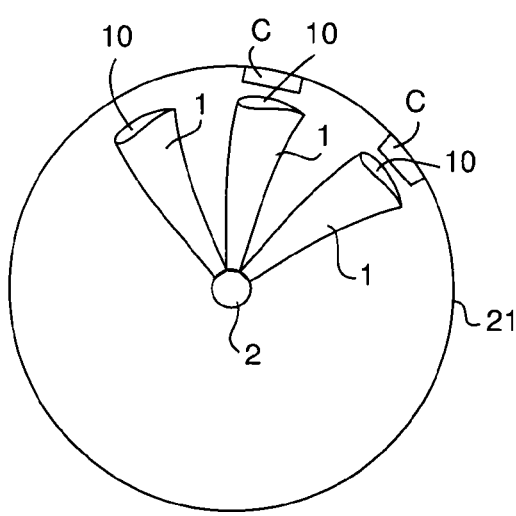
FIG. 2 is a front schematic view of a measurement of the deformation of a turbo-machine blade by a "tip timing" method according to prior art (already described)
Figure 3:
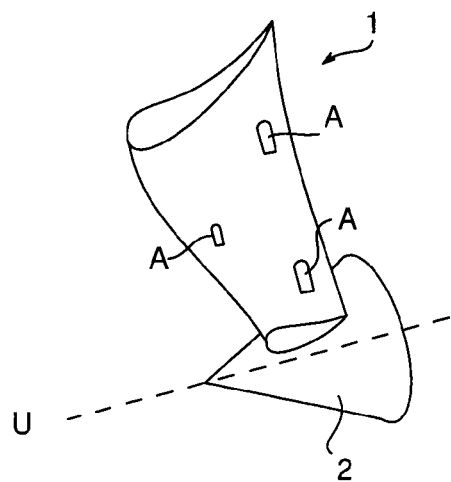
FIG. 3 is a schematic view of a measurement of the deformation of a blade by the method according to the invention by means of accelerometers placed onto the turbo-machine blade.
Figure 4:
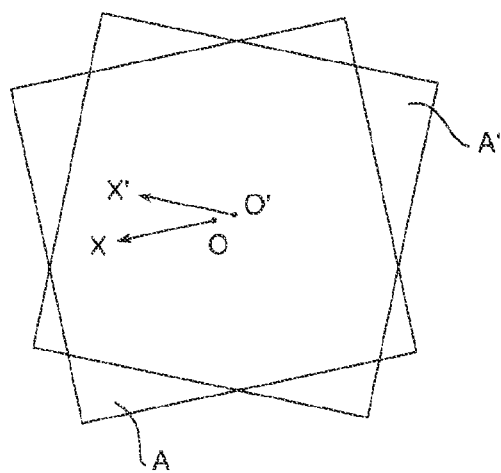
FIG. 4 is a close-up view of a displacement of an accelerometer when the turbo-machine blade is deformed, the accelerometer having a single measurement direction.
Figure 5:
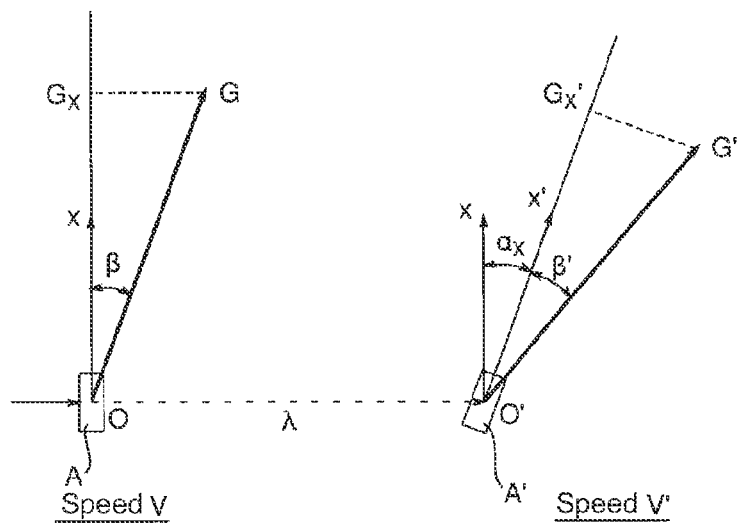
FIG. 5 is a detailed schematic representation of the measurement of the centrifugal force by an accelerometer, having a single measurement direction, during its displacement.

In reference to FIG. 3, to measure the deformation of a turbo-machine blade 1 radially mounted on a turbo-machine shaft 2 axially extending along an axis U, at least one accelerometer A is positioned on a local point of the turbo-machine blade 1. The accelerometer A is configured to measure an acceleration of the local point of the turbo-machine blade 1 along at least one given measurement direction. In the following, an accelerometer A having a centre O measuring an acceleration only along a measurement direction reference X will be presented (FIGS. 4 and 5).

In this example, each accelerometer A is in the form of a microelectromechanical system sensor known to those skilled in the art as MEMS. Such an accelerometer has reduced dimensions and mass (in the order of 0.1 g) so as not to disturb the aerodynamic behaviour of the blade 1 it is mounted to.

Preferably, each MEMS accelerometer is a piezoresistive sensor which converts an acceleration in a given direction into a determined electric current which is then transmitted to a calculator. It goes without saying that other types of MEMS sensors could also be suitable.

In this example, each accelerometer A is attached to the surface of a turbo-machine blade by bonding. It goes without saying that any attaching means could also be suitable. Furthermore, an accelerometer A can also be mounted in the thickness of a turbo-machine blade, for example between folds of a blade of composite material.

As represented in FIG. 4, an accelerometer A having a centre O is displaced when the blade 1 is deformed. At its initial position, the accelerometer is referenced AN and has a centre O for measuring an acceleration along the direction X. After deformation of the blade 1, the accelerometer is referenced A' and has a centre O' for measuring an acceleration along the direction X'. This referencing is used in FIGS. 4 to 6 to describe the displacement of a same accelerometer over time.

Rotating the Turbo-Machine Blade at a First Rotation Speed

The turbo-machine is actuated to rotate the turbo-machine shaft 2 about the axis U. The turbo-machine blade 1 is then subjected to a centrifugal force G directed radially to the axis U and the value of which is a function of the rotation speed of the turbo-machine shaft 3.

According to the invention, the turbo-machine blade 1 is first rotationally driven at a first speed V. Each accelerometer A positioned on the blade 1 then measures the centrifugal force Gx along the measurement direction X of the accelerometer A as represented in FIG. 5. In this example, the measurement direction X of the accelerometer A is at an angle β with the centrifugal direction G. The centrifugal direction G passing through the centre O is perfectly known since it is intrinsically defined with respect to the rotation axis U of the turbo-machine.

At the first rotation speed V, the accelerometer A measures the centrifugal acceleration G along the axis U according to the following mathematical formula:

$$Gx = G \cdot \cos(\beta) \quad (1)$$

The measurement of the acceleration Gx of the accelerometer A is transmitted to a calculator. With several accelerometers, a measurement of the acceleration Gx is advantageously obtained at a plurality of local positions of the turbo-machine blade 1.

Rotating the Turbo-Machine Blade at a Second Rotation Speed

The turbo-machine blade 1 is then rotationally driven at a second speed V'. This change in speed causes a deformation of the turbo-machine blade 2 which can elongate, twist, etc. In reference to FIG. 5, the deformation of the blade 1 causes a displacement of the accelerometer A by a distance λ in a fixed frame of the blade. In the centrifugal frame related to the accelerometer A, the deformation of the blade 1 causes a rotation in the measurement direction X of the accelerometer A by an angle $\alpha_x$ as represented in FIG. 5.

In other words, during the deformation of the blade 1, the measurement direction X of the accelerometer A turns by a deformation angle $\alpha_x$ to extend along the direction X' as represented in FIG. 5. Thus, any local deformation of the blade 1 can be determined by measuring the deformation angle $\alpha_x$ of each accelerometer A.

At the second rotation speed V', the measurement direction X' of the accelerometer A' is at an angle β' with the centrifugal direction G' as represented in FIG. 5. As the centrifugal direction G' is perfectly defined, the angle β' is known by the following relationship:

$$\beta' = \beta - \alpha_x \quad (2)$$

In a manner similar to the first formula (1), for a second rotation speed V', the accelerometer A' measures the centrifugal acceleration G' along the axis X' according to following function:

$$Gx' = G' \cdot \cos(\beta') = G' \cdot \cos(\beta - \alpha_x) \quad (3)$$

Determining the Angular Displacement of the Accelerometer

In order to measure the deformation angle $\alpha_x$ of the accelerometer A and then infer its local deformation therefrom, the first acceleration measurement Gx and the second acceleration measurement Gx' previously obtained are used.

According to a first aspect of the invention, the value of the centrifugal force G is obtained at the first predetermined rotation speed V and the value of the centrifugal force G' is obtained at the second predetermined rotation speed V'. In this example, the values of the centrifugal forces G, G', that is their norms, are obtained by measurement but they could also be obtained by calculation or assessment.

By combination of the previous formulae (1) and (3), the following mathematical relationships are obtained:

$$\beta = \arccos\left(\frac{Gx}{G}\right) \quad (4)$$

$$\beta - \alpha_x = \arccos\left(\frac{Gx'}{G'}\right) \quad (5)$$

$$\alpha_x = \arccos\left(\frac{Gx'}{G}\right) - \arccos\left(\frac{Gx'}{G'}\right). \quad (6)$$

Since the parameters Gx, G, Gx', G' are known, the deformation angle $\alpha_x$ of the accelerometer A can be inferred therefrom. During tests, the deformation angle $\alpha_x$ is determined with an accuracy in the order of a tenth of a degree which ensures the accuracy of the theoretical model of the turbo-machine blade 1. Further to this measurement of angular deformation, the theoretical model of the turbo-machine blade 1 can be reset by comparing the measured angular deformation $\alpha_x$ with the angular deformation predicted by the theoretical model. The reset theoretical model is then compliant with the actual behaviour of the blade which enables numerous simulations to be made from the theoretical model of the blade without resorting to an actual blade.

Figure 6:
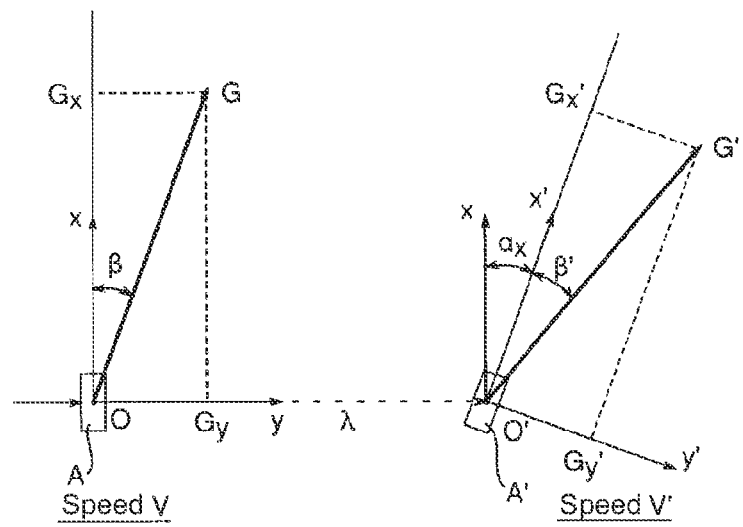
FIG. 6 is a detailed schematic representation of the measurement of the centrifugal force by an accelerometer, having two orthogonal measurement directions, during its displacement.

According to a second aspect of the invention, the accelerometer A having a centre O measures an acceleration along a measurement direction referenced X and a measurement direction referenced Y (FIG. 6). In this example, the measurement directions X, Y are orthogonal but it goes without saying that it would be sufficient that they are non-collinear so as to form a base in the plane of the accelerometer A. By virtue of this second measurement direction Y, with reference to FIG. 6, a centrifugal acceleration Gy is measured along the measurement direction Y so as to obtain the following relationships:

$$Gy = G \cdot \sin(\beta) \quad (7)$$

$$Gy' = G' \cdot \sin(\beta') = G' \cdot \sin(\beta - \alpha_x) \quad (8)$$

$$\frac{Gy}{Gx} = \tan(\beta) \quad (9)$$

$$\frac{Gy'}{Gx'} = \tan(\beta'). \quad (10)$$

By combining the previous formulae (2), (9), (10), the following mathematical relationship is obtained:

$$\alpha_x = \arctan\left(\frac{Gy}{Gx}\right) - \arctan\left(\frac{Gy'}{Gx'}\right) \quad (11)$$

Since the parameters Gx, Gy, Gx', Gy' are known, the deformation angle $\alpha_x$ of the accelerometer A can be inferred therefrom. Advantageously, it is not necessary to obtain the value of the centrifugal force G at the first predetermined rotation speed V and the value of the centrifugal force G' at the second predetermined rotation speed V'. This increases the accuracy in measuring the deformation angle $\alpha_x$, the inaccuracy related to the value of the centrifugal force G, G' having no influence on determining their deformation angle $\alpha_x$.

Further, by virtue of both measurement directions X, Y, the deformation angle can be advantageously measured with accuracy when the blade 1 is radially elongated under the effect of centrifugal forces.

According to a third aspect of the invention, the accelerometer A having a centre O measures an acceleration along a measurement direction referenced X, a measurement direction referenced Y and a measurement direction referenced Z. In this example, measurement directions X, Y, Z are orthogonal so as to form an orthogonal base but it goes without saying that it could be sufficient that they are non-collinear so as to form a base. An accelerometer A with three measurement directions enables a measurement trihedron to be formed wherein the centrifugal force G can be wholly decomposed.

By virtue of the three measurement directions X, Y, Z, the sensitivity in the measurement can be advantageously increased when the accelerometer A extends in a plane tangent to the curvature of the blade 1. In other words, flexion and torsion type deformations of the blade 1 are measured with a higher accuracy.

Preferably, the deformation angle $\alpha_x$ is measured for a plurality of accelerometers positioned on the turbo-machine blade 1. An accurate measurement of the local deformation of the turbo-machine blade 1 is thus obtained. This is particularly advantageous for a blade of composite material the global deformation of which cannot be readily be inferred because of its stiffness defined along preferential directions. Preferably, the accelerometers A are placed at different radii of the turbo-machine blade 1.

The invention claimed is:

1. A method for measuring the deformation of a turbo-machine blade comprising:
    positioning an accelerometer onto a local point of the turbo-machine blade, the accelerometer being capable of measuring an acceleration at the local point of the turbo-machine blade along a first given measurement direction;
    rotating the turbo-machine blade at a first predetermined speed such that the accelerometer is subjected to a first centrifugal force having a determined direction;
    obtaining a first value of the first centrifugal force at the first predetermined rotation speed;
    measuring the first centrifugal force, by the accelerometer, at the local point of the turbo-machine blade along the first given measurement direction;
    rotating the turbo-machine blade at a second predetermined speed, different from the first predetermined speed, so as to cause an angular displacement of the measurement direction of the accelerometer relative to the centrifugal direction and the accelerometer is subjected to a second centrifugal force;
    obtaining a second value of the second centrifugal force at the second predetermined rotation speed;
    measuring the second centrifugal force, by the accelerometer, at the local point of the turbo-machine blade along the first given measurement direction displaced by the angular displacement; and
    determining the angular displacement as a function of the measured centrifugal forces at the first predetermined speed and the measured centrifugal forces at the second predetermined speed, said angular displacement corresponding to an angular deformation of the local point of the turbo-machine blade,
    wherein the angular displacement is determined by the following formula:

$$\alpha_x = \arccos\left(\frac{Gx}{G}\right) - \arccos\left(\frac{Gx'}{G'}\right)$$

in which $\alpha_x$ at is the angular displacement, Gx is the first centrifugal force measured along the first given measurement direction, G is the first centrifugal force, Gx' is the second centrifugal force measured along the first given measurement direction displaced by the angular displacement, and G' is the second centrifugal force.

2. The method according to claim 1, wherein the accelerometer being capable of measuring the acceleration at the local point of the turbo-machine blade along first and second given measurement directions, the method comprises:
    measuring the first centrifugal force, by the accelerometer, at the local point of the turbo-machine blade along the first and second given measurement directions at the first predetermined speed;
    rotating the turbo-machine blade at the second predetermined speed different from the first predetermined speed, so as to cause the angular displacement of the first and second given measurement directions relative to the centrifugal direction;
    measuring the second centrifugal force, by the accelerometer, at the local point of the turbo-machine blade along the first and second given measurement directions displaced by the angular displacement at the second predetermined speed; and determining the angular displacement as a function of the measured centrifugal forces at the first predetermined speed and the measured centrifugal forces at the second predetermined speed, said angular displacement corresponding to the angular deformation of the local point of the turbo-machine blade.

3. The method according to claim 2, wherein the first and second measurement directions are orthogonal, the angular displacement being determined by the following formula:

$$\alpha_x = \arccos\left(\frac{Gx}{G}\right) - \arccos\left(\frac{Gx'}{G'}\right)$$

in which $\alpha_x$ is the angular displacement, Gy is the first centrifugal force measured along the second given measurement direction, Gx is the first centrifugal force measured along the first given measurement direction, Gy' is the second centrifugal force measured along the second given measurement direction displaced by the angular displacement, and Gx' is the second centrifugal force measured along the first given measurement direction displaced by the angular displacement.

4. The method according to claim 1, wherein the accelerometer is capable of measuring the acceleration at the local point of the turbo-machine blade along at least three different given measurement directions forming an orthogonal trihedron.

5. The method according to claim 1, wherein the accelerometer is a microelectromechanical system.

6. The method according to claim 1, wherein the accelerometer has a mass in the order of 0.1 g.

7. The method according to claim 1, wherein at least one accelerometer is positioned at the surface of the turbo-machine blade.

8. The method according to claim 1, wherein at least one accelerometer is positioned in the thickness direction of the turbo-machine blade.

9. The method according to claim 1, wherein the accelerometer is positioned on a turbo-machine blade of composite material.

10. The method according to claim 5, wherein, the accelerometer is a piezoresistive sensor.

* * * * *